(12) United States Patent
Landon

(10) Patent No.: US 7,541,076 B2
(45) Date of Patent: *Jun. 2, 2009

(54) INSULATED GLASS UNIT WITH SEALANT COMPOSITION HAVING REDUCED PERMEABILITY TO GAS

(75) Inventor: Shayne J. Landon, Ballston Lake, NY (US)

(73) Assignee: Momentive Performance Materials Inc., Albany, NY (US)

( * ) Notice: Subject to any disclaimer, the term of this patent is extended or adjusted under 35 U.S.C. 154(b) by 313 days.

This patent is subject to a terminal disclaimer.

(21) Appl. No.: 11/345,463

(22) Filed: Feb. 1, 2006

(65) Prior Publication Data

US 2007/0178257 A1  Aug. 2, 2007

(51) Int. Cl.
*E06B 3/00* (2006.01)
*C08G 18/06* (2006.01)

(52) U.S. Cl. .................. 428/34; 428/34.4; 528/66
(58) Field of Classification Search ............. 428/34, 428/429

See application file for complete search history.

(56) References Cited

U.S. PATENT DOCUMENTS

| | | | |
|---|---|---|---|
| 3,627,722 A | 12/1971 | Selter et al. | |
| 3,632,557 A | 1/1972 | Brode et al. | |
| 3,786,081 A | 1/1974 | Oppenlaender et al. | |
| 3,829,505 A | 8/1974 | Herold et al. | |
| 3,941,849 A | 3/1976 | Herold | |
| 3,971,751 A | 7/1976 | Isayama et al. | |
| 4,242,490 A | 12/1980 | Emerson et al. | |
| 4,335,188 A | 6/1982 | Igi et al. | |
| 4,345,053 A | 8/1982 | Rizk et al. | |
| 4,374,237 A | 2/1983 | Berger et al. | |
| 4,481,367 A | 11/1984 | Knopf | |
| 4,625,012 A | 11/1986 | Rizk et al. | |
| 4,645,816 A | 2/1987 | Pohl et al. | |
| 4,687,851 A | 8/1987 | Laughner | |
| 4,798,878 A | 1/1989 | Brinkmann et al. | |
| 4,889,879 A * | 12/1989 | Seinera et al. ............. 524/13 |
| 4,985,491 A | 1/1991 | Reisch | |
| 5,096,993 A | 3/1992 | Smith et al. | |
| 5,100,997 A | 3/1992 | Reisch et al. | |
| 5,106,874 A | 4/1992 | Porter et al. | |
| 5,116,931 A | 5/1992 | Reisch et al. | |

(Continued)

FOREIGN PATENT DOCUMENTS

EP   676 403   7/1978

(Continued)

OTHER PUBLICATIONS

Burnside et al., "Nanostructure and Properties of Polysiloxane-Layered Silicate Nanocomposites", Dept. of Materials Science and Engineering, Bard Hall, Itahaca, New York 14850, pp. 1595-1604, Mar. 28, 2000.

(Continued)

*Primary Examiner*—Randy Gulakowski
*Assistant Examiner*—Robert Loewe
(74) *Attorney, Agent, or Firm*—Dominick G. Vicari

(57) ABSTRACT

The invention relates to a high thermal efficiency, insulated glass unit structure sealed with a cured composition containing, inter alia, moisture-curable silylated resin, the cured composition exhibiting low permeability to gas(es).

18 Claims, 1 Drawing Sheet

U.S. PATENT DOCUMENTS

| | | | |
|---|---|---|---|
| 5,120,379 A | 6/1992 | Noda et al. | |
| 5,136,010 A | 8/1992 | Reisch et al. | |
| 5,185,420 A | 2/1993 | Smith et al. | |
| 5,266,681 A | 11/1993 | Reisch et al. | |
| 5,364,955 A | 11/1994 | Zweiner et al. | |
| 5,464,888 A | 11/1995 | Owen | |
| 5,519,104 A | 5/1996 | Lucas | |
| 5,539,045 A | 7/1996 | Potts et al. | |
| 5,567,530 A | 10/1996 | Drujon et al. | |
| 5,623,044 A | 4/1997 | Chiao | |
| 5,653,073 A * | 8/1997 | Palmer | 52/204.593 |
| 5,804,253 A | 9/1998 | Hagiwara et al. | |
| 5,849,832 A | 12/1998 | Virnelson et al. | |
| 5,852,137 A | 12/1998 | Hsieh et al. | |
| 5,873,203 A * | 2/1999 | Thiel | 52/172 |
| 5,919,888 A | 7/1999 | Lawrey et al. | |
| 5,990,257 A | 11/1999 | Johnston et al. | |
| 6,001,946 A | 12/1999 | Waldman et al. | |
| 6,055,783 A * | 5/2000 | Guhl et al. | 52/204.62 |
| 6,103,850 A * | 8/2000 | Reichel et al. | 528/60 |
| 6,121,354 A * | 9/2000 | Chronister | 524/262 |
| 6,136,446 A | 10/2000 | Virnelson et al. | |
| 6,136,910 A | 10/2000 | Virnelson et al. | |
| 6,150,441 A | 11/2000 | Chiba et al. | |
| 6,197,912 B1 | 3/2001 | Huang et al. | |
| 6,207,794 B1 | 3/2001 | Yamasaki et al. | |
| 6,265,517 B1 | 7/2001 | Stuart | |
| 6,284,360 B1 | 9/2001 | Johnson et al. | |
| 6,286,288 B1 * | 9/2001 | France | 52/786.1 |
| 6,303,731 B1 | 10/2001 | Carlson et al. | |
| 6,310,170 B1 | 10/2001 | Johnston et al. | |
| 6,355,317 B1 * | 3/2002 | Reid et al. | 428/34 |
| 6,359,101 B1 | 3/2002 | O'Connor et al. | |
| 6,372,827 B2 | 4/2002 | Johnson et al. | |
| 6,401,428 B1 * | 6/2002 | Glover et al. | 52/786.13 |
| 6,406,782 B2 | 6/2002 | Johnson et al. | |
| 6,448,362 B1 * | 9/2002 | McGraw et al. | 528/44 |
| 6,457,294 B1 | 10/2002 | Virnelson et al. | |
| 6,463,706 B1 * | 10/2002 | Guhl et al. | 52/204.62 |
| 6,498,210 B1 | 12/2002 | Wang et al. | |
| 6,515,164 B1 | 2/2003 | Bolte et al. | |
| 6,602,964 B2 | 8/2003 | Huang et al. | |
| 6,784,272 B2 | 8/2004 | Mack et al. | |
| 6,822,035 B2 * | 11/2004 | Chaiko | 524/445 |
| 6,828,403 B2 | 12/2004 | Mahdi et al. | |
| 6,833,423 B2 | 12/2004 | Roesler et al. | |
| 2002/0100550 A1 | 8/2002 | Mahdi et al. | |
| 2002/0194813 A1 | 12/2002 | Virnelson et al. | |
| 2002/0198352 A1 | 12/2002 | Tanaka et al. | |
| 2003/0162882 A1 | 8/2003 | Grimm et al. | |
| 2003/0176537 A1 * | 9/2003 | Chaiko | 523/200 |
| 2004/0113311 A1 * | 6/2004 | Hasegawa et al. | 264/236 |
| 2004/0122253 A1 | 6/2004 | Smith et al. | |
| 2004/0180155 A1 | 9/2004 | Nguyen-Misra et al. | |
| 2004/0181007 A1 * | 9/2004 | Acevedo et al. | 524/589 |
| 2004/0188016 A1 | 9/2004 | Mahdi et al. | |
| 2004/0258859 A1 * | 12/2004 | Acevedo et al. | 428/34 |
| 2005/0020706 A1 | 1/2005 | Kollbach et al. | |
| 2005/0191490 A1 * | 9/2005 | Ton-That et al. | 428/407 |
| 2005/0215701 A1 * | 9/2005 | Porsch et al. | 524/589 |
| 2006/0128866 A1 * | 6/2006 | Diakoumakos et al. | 524/445 |
| 2006/0235128 A1 * | 10/2006 | Wang et al. | 524/445 |
| 2007/0105998 A1 * | 5/2007 | Gong et al. | 524/236 |
| 2007/0106006 A1 * | 5/2007 | Cooper et al. | 524/445 |
| 2007/0178256 A1 * | 8/2007 | Landon | 428/34 |

FOREIGN PATENT DOCUMENTS

| | | |
|---|---|---|
| EP | 0 931 800 | 7/1999 |
| EP | 1 462 500 | 9/2004 |
| FR | 1411160 | 9/1965 |
| WO | WO 9731057 A1 * | 8/1997 |
| WO | WO 9825001 A2 * | 6/1998 |
| WO | 98/58003 | 12/1998 |
| WO | WO 9914169 A1 * | 3/1999 |
| WO | 01/16201 | 3/2001 |
| WO | WO 01/16046 | 3/2001 |
| WO | WO 2004056913 A1 * | 7/2004 |
| WO | WO 2004/083296 | 9/2004 |

OTHER PUBLICATIONS

Y. Geerts et al., "Morphology and Permeability of Polymer Blends-I. Crosslinked EPDM-Silicone Blends", Eur. Polym. J. vol. 32, No. 2, pp. 143-145, 1996.

Peter C. LeBaron et al., "Clay Nanolayer Reinforcement of a Silicone Elastomer", Chem. Mater. 2001, 13, pp. 3760-3765, Jun. 26, 2001.

K. Mizoguchi et al., "Miscibility and gas permeability of poly (ethylene-co-5, 4 mol% 3. 5. 5-trimethylhexyl methacrylate) polydimethyl-siloxane blends", Colloid Polym Sci 275:86 90 (1997), pp. 87-90, 1997.

Alexandre M. et al. (2002) "Polymer-layered silicate nanocomposites: preparation, properties and uses of a new class of materials," *Materials Science and Engineering Reports*, vol. 2 No. 1-2, p. 1-63.

Ginzburg V.V. et al. (1999) "Calculating Phase Diagrams of Polymer—Platelet Mixtures Using Density Functional Theory; Implications for Polymer/Clay Composites", *Macromolecules*, ACS, vol. 32, p. 5681-5688.

\* cited by examiner

INSULATED GLASS UNIT WITH SEALANT COMPOSITION HAVING REDUCED PERMEABILITY TO GAS

FIELD OF THE INVENTION

This invention is generally related to thermally insulating structures, and more particularly to a high thermal efficiency, insulated glass unit structure sealed with room temperature-cured compositions having reduced permeability to gas, or mixtures of gases.

BACKGROUND OF THE INVENTION

Room temperature-curable (RTC) compositions are well known for their use as sealants. In the manufacture of Insulating Glass Units (IGU) panels of glass are placed parallel to each other and sealed at their periphery such that the space between the panels, or the inner space, is completely enclosed. The inner space is typically filled with air. The transfer of energy through an insulating glass unit of this typical construction is reduced, due to the inclusion of the insulating layer of air in the inner space, as compared to a single panel of glass. The energy transfer may be further reduced by increasing the separation between the panels to increase the insulating blanket of air. There is a limit to the maximum separation beyond which convection within the air between the panels can increase energy transfer. The energy transfer may be further reduced by adding more layers of insulation in the form of additional inner spaces and enclosing glass panels. For example three parallel spaced apart panels of glass separated by two inner spaces and sealed at their periphery. In this manner the separation of the panels is kept below the maximum limit imposed by convection effects in the airspace, yet the overall energy transfer can be further reduced. If further reduction in energy transfer is desired then additional inner spaces can be added.

Additionally, the energy transfer of sealed insulating glass units may be reduced by substituting the air in a sealed insulated glass window for a denser, lower conductivity gas. Suitable gases should be colorless, non-toxic, non-corrosive, non-flammable, unaffected by exposure to ultraviolet radiation, and denser than air, and of lower conductivity than air. Argon, krypton, xenon, and sulfur hexaflouride are examples of gases which are commonly substituted for air in insulating glass windows to reduce energy transfer.

Various types of sealants are currently used in the manufacture of insulated glass units including both curing and non-curing systems. Liquid polysulphides, polyurethanes and silicones represent curing systems, which are commonly used, while polybutylene-polyisoprene copolymer rubber based hot melt sealants are commonly used non-curing systems.

Liquid polysulphides and polyurethanes are generally two component systems comprising a base and a curing agent that are then mixed just prior to application to the glass. Silicones may be one component as well as two component systems. Two component systems require a set mix ratio, two-part mixing equipment and cure time before the insulating glass units can be moved onto the next manufacturing stage.

However, current RTC silicone sealant compositions, while effective to some extent, still have only a limited ability to prevent the loss of low thermal conductivity gas, e.g., argon, from the inner space of an IGU. As a result of this permeability, the reduced energy transfer maintained by the gas between the panels of glass is lost over time.

A need therefore exists for an IGU with a RTC composition of reduced gas permeability compared to that of known RTC compositions. When employed as the sealant for an IGU, an RTC composition of reduced gas permeability will retain the intra-panel insulating gas of an IGU for a longer period of time compared to that of a more permeable RTC composition and therefore will extend the insulating properties of the IGU over a longer period of time.

SUMMARY OF THE INVENTION

The present invention relates to an insulated glass unit with increased thermal insulation stability. Specifically, the present invention relates to an insulated glass unit which comprises at least two spaced-apart sheets (panes) of glass, or of other functionally equivalent material, in spaced relationship to each other, a low thermal conductivity gas therebetween and a gas sealant element including a cured sealant composition resulting from the curing of, moisture-curable silylated resin-containing composition comprising:
  a) moisture-curable silylated resin, which upon curing, provides cured resin, exhibiting permeability to gas; and,
  b) at least one other polymer having a permeability to gas that is less than the permeability of cured resin (a), and, optionally,
  c) at least one additional component selected from the group consisting of catalyst, filler, UV stabilizer, antioxidant, adhesion promoter, cure accelerator, thixotropic agent, moisture scavenger, pigment, dye, surfactant, solvent and biocide.

When used as a component of the gas sealant of an IGU, the foregoing cured sealant composition reduces the loss of gas (es) from the IGU thus extending its useful service life.

DETAILED DESCRIPTION OF THE INVENTION

Figure 1:
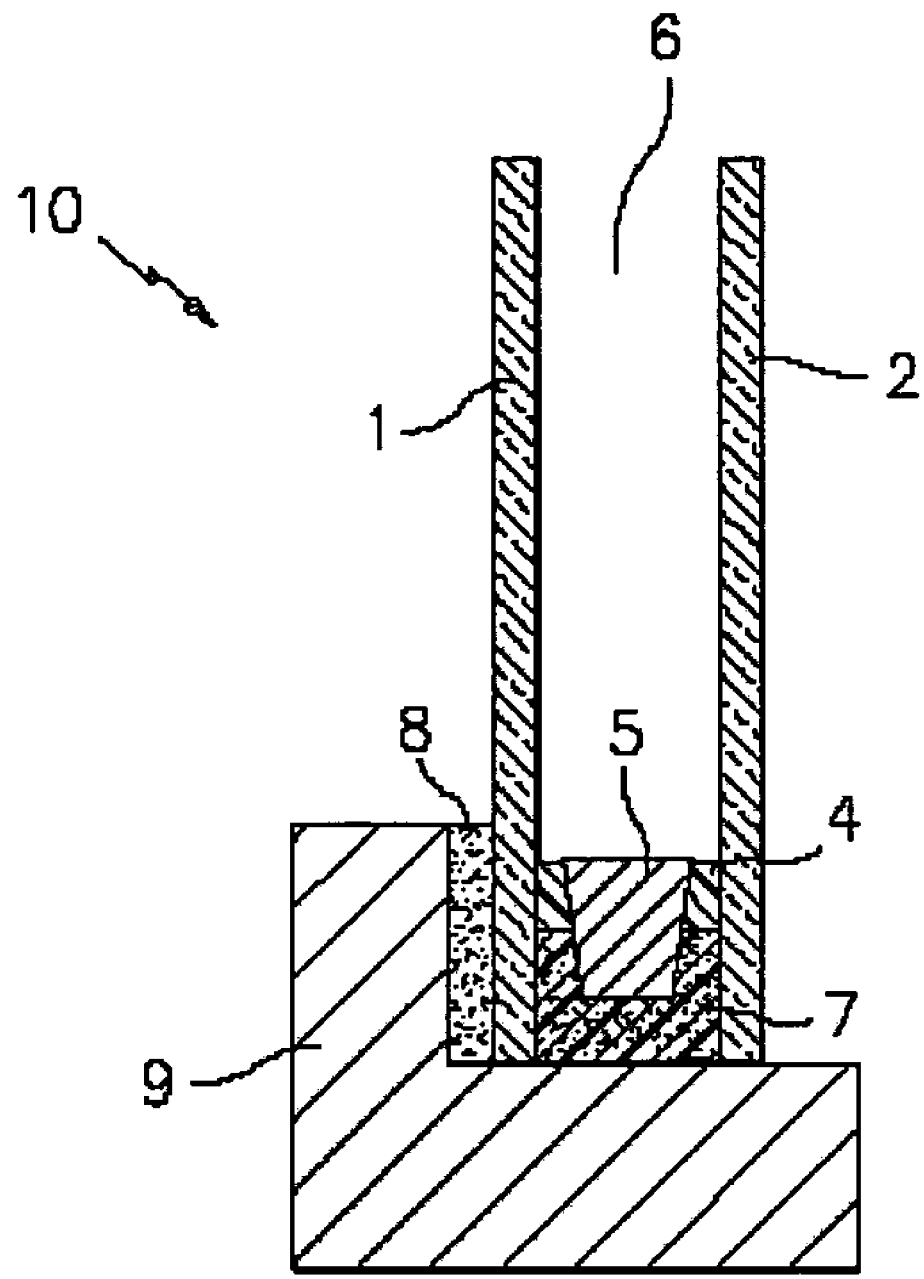
FIG. 1 is a sectional side view of a double glazed insulated glass unit (IGU) possessing a gas sealant element which includes a cured sealant composition in accordance with the invention.

The present invention provides an insulated glass unit comprising at least two spaced-apart sheets of glass in spaced relationship to each other, a low thermal conductivity gas therebetween and gas sealant element including a cured, i.e., crosslinked or vulcanized, sealant composition resulting from the curing of, moisture-curable silylated resin-containing composition comprising: a) moisture-curable silylated resin, which upon curing, provides cured resin, exhibiting permeability to gas; and, b) at least one other polymer having a permeability to gas that is less than the permeability of cured resin (a), and, optionally, c) at least one additional component selected from the group consisting of filler, adhesion promoter, catalyst, surfactant, UV stabilizer, antioxidant, cure accelerator, thixotropic agent, moisture scavenger, pigment, dye, solvent and biocide.

With reference to FIG. 1, insulated glass unit 10 of known and conventional construction includes glass sheets 1 and 2 maintained in spaced-apart relationship by a gas sealant element possessing a primary gas sealant member 4, continuous spacer member 5 and low gas permeable sealant composition 7 prepared as hereinafter described, space 6 between sheets 1 and 2 being filled with an insulating gas or gases such as argon. A glazing bead 8, as known in the art, is placed between glass sheets 1 and 2 and window frame 9. Panes 1 and 2 can be fabricated from any of a variety of materials such as glass, e.g., clear float glass, annealed glass, tempered glass, solar glass, tinted glass, e.g., low energy glass, etc., acrylic resin and polycarbonate resin, and the like.

The inclusion of cured sealant composition 7 in the foregoing gas sealant element provides improved gas barrier characteristics and moisture leakage characteristics relative to known and conventional gas sealants. As a result, cured sealant composition 7 provides for longer in-service performance of insulated glass units of all manner of construction including that specifically described above.

Primary sealant member 4 of the insulated glass unit can be comprised of polymeric materials known in the art, for example, rubber base materials such as polyisobutylene, butyl rubber, polysulfide, EPDM rubber, nitrile rubber, and the like. Other useful materials include, polyisobutylene/polyisoprene copolymers, polyisobutylene polymers, brominated olefin polymers, copolymers of polisobutylene and para-methylstyrene, copolymers of polyisobutylene and brominated para-methylstyrene, butyl rubber-copolymer of isobutylene and isoprene, ethylene-propylene polymers, polysulfide polymers, polyurethane polymers, styrene butadiene polymers, and the like.

As indicated above, primary gas sealant member 4 can be fabricated from a material such as polyisobutylene which has very good sealing properties. Glazing bead 8 is a sealant that is sometimes referred to as the glazing bedding and can be provided in the form of a silicone or butyl rubber. A desiccant can be included in continuous spacer 5 in order to remove moisture from the insulating gas occupied space between glass panes 1 and 2. Useful desiccants are those that do not adsorb the insulating gas/gases filling the interior of the insulated glass unit.

Suitable low thermal conductivity gases and mixtures of such gases for use in the insulated glass unit are well know and include transparent gases such as air, carbon dioxide, sulfur hexafloride, nitrogen, argon, krypton, xenon, and the like, and mixtures thereof.

The moisture-curable silylated resin (a) which can be employed in the present invention are known materials and in general can be obtained by (i) reacting an isocyanate-terminated polyurethane (PUR) prepolymer with a suitable silane, e.g., one possessing both hydrolyzable functionality, such as, alkoxy etc., and active hydrogen-containing functionality such as mercaptan, primary and secondary amine, preferably the latter, etc., or by (ii) reacting a hydroxyl-terminated PUR prepolymer with a suitable isocyanate-terminated silane, e.g., one possessing one to three alkoxy groups. The details of these reactions, and those for preparing the isocyanate-terminated and hydroxyl-terminated PUR prepolymers employed therein can be found in, amongst others: U.S. Pat. Nos. 4,985,491, 5,919,888, 6,207,794, 6,303,731, 6,359,101 and 6,515,164 and published U.S. patent application Ser. Nos. 2004/0122253 and 2005/0020706 (isocyanate-terminated PUR prepolymers); U.S. Pat. Nos. 3,786,081 and 4,481,367 (hydroxyl-terminated PUR prepolymers); U.S. Pat. Nos. 3,627,722, 3,632,557, 3,971,751, 5,623,044, 5,852,137, 6,197,912 and 6,310,170 (moisture-curable SPUR obtained from reaction of isocyanate-terminated PUR prepolymer and reactive silane, e.g., aminoalkoxysilane); and, U.S. Pat. Nos. 4,345,053, 4,625,012, 6,833,423 and published U.S. patent application Ser. No. 2002/0198352 (moisture-curable SPUR obtained from reaction of hydroxyl-terminated PUR prepolymer and isocyanatosilane). The entire contents of the foregoing U.S. patent documents are incorporated by reference herein.

The moisture-curable silylated resin (a) of the present invention may also be obtained by (iii) reacting isocyanatosilane directly with polyol.

(a) Moisture-curable SPUR Resin Obtained From Isocyanate-terminated PUR Prepolymer The isocyanate-terminated PUR prepolymers are obtained by reacting one or more polyols, advantageously, diols, with one or more polyisocyanates, advantageously, diisocyanates, in such proportions that the resulting prepolymers will be terminated with isocyanate. In the case of reacting a diol with a diisocyanate, a molar excess of diisocyanate will be employed.

Included among the polyols that can be utilized for the preparation of the isocyanate-terminated PUR prepolymer are polyether polyols, polyester polyols such as the hydroxyl-terminated polycaprolatones, polyetherester polyols such as those obtained from the reaction of polyether polyol with e-caprolactone, polyesterether polyols such as those obtained from the reaction of hydroxyl-terminated polycaprolactones with one or more alkylene oxides such as ethylene oxide and propylene oxide, hydroxyl-terminated polybutadienes, and the like.

Specific suitable polyols include the polyether diols, in particular, the poly(oxyethylene) diols, the poly(oxypropylene) diols and the poly(oxyethylene-oxypropylene) diols, polyoxyalkylene triols, polytetramethylene glycols, polyacetals, polyhydroxy polyacrylates, polyhydroxy polyester amides and polyhydroxy polythioethers, polycaprolactone diols and triols, and the like. In one embodiment of the present invention, the polyols used in the production of the isocyanate-terminated PUR prepolymers are poly(oxyethylene) diols with equivalent weights between about 500 and 25,000. In another embodiment of the present invention, the polyols used in the production of the isocyanate-terminated PUR prepolymers are poly(oxypropylene) diols with equivalent weights between about 1,000 to 20,000. Mixtures of polyols of various structures, molecular weights and/or functionalities can also be used.

The polyether polyols can have a functionality up to about 8 but advantageously have a functionality of from about 2 to 4 and more advantageously, a functionality of 2 (i.e., diols). Especially suitable are the polyether polyols prepared in the presence of double-metal cyanide (DMC) catalysts, an alkaline metal hydroxide catalyst, or an alkaline metal alkoxide catalyst; see, for example, U.S. Pat. Nos. 3,829,505, 3,941,849, 4,242,490, 4,335,188, 4,687,851, 4,985,491, 5,096,993, -5,100,997, 5,106,874, 5,116,931, 5,136,010, 5,185,420, and 5,266,681, the entire contents of which are incorporated here by reference. Polyether polyols produced in the presence of such catalysts tend to have high molecular weights and low levels of unsaturation, properties of which, it is believed, are responsible for the improved performance of inventive retroreflective articles. The polyether polyols preferably have a number average molecular weight of from about 1,000 to about 25,000, more preferably from about 2,000 to about 20,000, and even more preferably from about 4,000 to about 18,000. The polyether polyols preferably have an end group unsaturation level of no greater than about 0.04 milliequivalents per gram of polyol. More preferably, the polyether polyol has an end group unsaturation of no greater than about 0.02 milliequivalents per gram of polyol. Examples of commercially available diols that are suitable for making the isocyanate-terminate PUR prepolymer include ARCOL R-1819 (number average molecular weight of 8,000), E-2204 (number average molecular weight of 4,000), and ARCOL E-2211 (number average molecular weight of 11,000).

Any of numerous polyisocyanates, advantageously, diisocyanates, and mixtures thereof, can be used to provide the isocyanate-terminated PUR prepolymers. In one embodiment, the polyisocyanate can be diphenylmethane diisocyanate ("MDI"), polymethylene polyphenylisocyanate ("PMDI"), paraphenylene diisocyanate, naphthylene diisocyanate, liquid carbodiimide-modified MDI and derivatives thereof, isophorone diisocyanate, dicyclohexylmethane-4,4'-diisocyanate, toluene diisocyanate ("TDI"), particularly the 2,6-TDI isomer, as well as various other aliphatic and aromatic polyisocyanates that are well-established in the art, and combinations thereof.

Silylation reactants for reaction with the isocyanate-terminated PUR prepolymers described above must contain functionality that is reactive with isocyanate and at least one readily hydrolyzable and subsequently crosslinkable group, e.g., alkoxy. Particularly useful silylation reactants are the aminosilanes, especially those of the general formula:

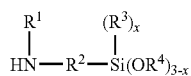

wherein $R^1$ is hydrogen, alkyl or cycloalkyl of up to 8 carbon atoms or aryl of up to 8 carbon atoms, $R^2$ is an alkylene group of up to 12 carbon atoms, optionally containing one or more heteroatoms, each $R^3$ is the same or different alkyl or aryl group of up to 8 carbon atoms, each $R^4$ is the same or different alkyl group of up to 6 carbon atoms and x is 0, 1 or 2. In one embodiment, $R^1$ is hydrogen or a methyl, ethyl, propyl, isopropyl, n-butyl, t-butyl, cyclohexyl or phenyl group, $R^2$ possesses 1 to 4 carbon atoms, each $R^4$ is the same or different methyl, ethyl, propyl or isopropyl group and x is 0.

Specific aminosilanes for use herein include aminopropyltrimethoxysilane, aminopropyltriethoxysilane, aminobutyltriethoxysilane, N-(2-aminoethyl-3-aminopropyl)triethoxysilane, aminoundecyltrimethoxysilane, and aminopropylmethyldiethoxysilane, for example. Other suitable aminosilanes include, but are not limited to phenylaminopropyltriemthoxy silane, methylaminopropyltriemthoxysilane, n-butylaminopropyltrimethoxy silane, t-butyl aminopropyltrimethoxysilane, cyclohexylaminopropyltrimethoxysilane, dibutylmaleate aminopropyltriemthoxysilane, dibutylmaleate-substituted 4-amino-3,3-dimethylbutyl trimethoxy silane, N-methyl-3-amino-2-methylpropyltriemthoxysilane, N-ethyl-3-amino-2-methylpropyltrimethoxysilane, N-ethyl-3-amino-2-methylpropyidiethoxysilane, N-ethyl-3-amino-2-methylpropyoltriethoxysilane, N-ethyl-3-amino-2-methylpropylmethyidimethoxysilane, N-butyl-3-amino-2-methylpropyltriemthoxysilane, 3-(N-methyl-3-amino-1-methyl-1-ethoxy)propyltrimethoxysilane, N-ethyl-4-amino-3,3-dimethylbutyidimethoxymethylsilane and N-ethyl-4-amino-3,3-dimethylbutyltrimethoxysilane.

A catalyst will ordinarily be used in the preparation of the isocyanate-terminated PUR prepolymers. Advantageously, condensation catalysts are employed since these will also catalyze the cure (hydrolysis followed by crosslinking) of the SPUR resin component of the curable compositions of the invention. Suitable condensation catalysts include the dialkyltin dicarboxylates such as dibutyltin dilaurate and dibutyltin acetate, tertiary amines, the stannous salts of carboxylic acids, such as stannous octoate and stannous acetate, and the like. In one embodiment of the present invention, dibutyltin dilaurate catalyst is used in the production of the PUR prepolymer. Other useful catalysts include zirconium complex (KAT XC6212, K-KAT XC-A209 available from King Industries, Inc., aluminum chelate (TYZER® types available from DuPont company, and KR types available from Kenrich Petrochemical, Inc., and other organic metal, such as Zn, Co, Ni, and Fe, and the like.

(b) Moisture-curable SPUR Resins Obtained From Hydroxyl-terminated PUR Preolymers The moisture-curable SPUR resin can, as previously indicated, be prepared by reacting a hydroxyl-terminated PUR prepolymer with an isocyanatosilane. The hydroxyl-terminated PUR prepolymer can be obtained in substantially the same manner employing substantially the same materials, i.e., polyols, polyisocyanates and optional catalysts (preferably condensation catalysts), described above for the preparation of isocyanate-terminated PUR prepolynmers the one major difference being that the proportions of polyol and polyisocyanate will be such as to result in hydroxyl-termination in the resulting prepolymer. Thus, e.g., in the case of a diol and a diisocyanate, a molar excess of the former will be used thereby resulting in hydroxyl-terminated PUR prepolymer.

Useful silylation reactants for the hydroxyl-terminated SPUR resins are those containing isocyanate termination and readily hydrolizable functionality, e.g., 1 to 3 alkoxy groups. Suitable silylating reactants are the isocyanatosilanes of the general formula:

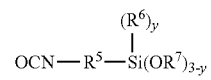

wherein $R^5$ is an alkylene group of up to 12 carbon atoms, optionally containing one or more heteroatoms, each $R^6$ is the same or different alkyl or aryl group of up to 8 carbon atoms, each $R^7$ is the same or different alkyl group of up to 6 carbon atoms and y is 0, 1 or 2. In one embodiment, $R^5$ possesses 1 to 4 carbon atoms, each $R^7$ is the same or different methyl, ethyl, propyl or isopropyl group and y is 0.

Specific isocyanatosilanes that can be used herein to react with the foregoing hydroxyl-terminated PUR prepolymers to provide moisture-curable SPUR resins include isocyanatopropyltrimethoxysilane, isocyanatoisopropyl trimethoxysilane, isocyanato-n-butyltrimethoxysilane, isocyanato-t-butyltrimethoxysilane, isocyanatopropyltriethoxysilane, isocyanatoisopropyltriethoxysilane, isocynato-n-butyltriethoxysilane, isocyanato-t-butyltriethoxysilane, and the like.

c) Moisture-curable SPUR Resins Obtained From Reacting Isocyanatosilane directly with a Polyol The moisture-curable SPUR resins of the present invention can be obtained from one or more polyols, advantageously, diols, reacting directly with isocyanatosilane without the initial formation of a polyurethane prepolymer.

The materials, i.e., polyols and silanes (e.g., one possessing both hydrolysable and isocyanato functionality, useful for this approach to producing moisture-curable SPUR resin are described above. As such, suitable polyols include, hydroxy-terminated polyols having a molecular weight between about 4,000 to 20,000. However, mixtures of polyols of various structures, molecular weights and/or functionalities can also be used. Suitable isocyanatosilanes used to react with the foregoing polyols to provide moisture-curable SPUR resins are described above.

The urethane prepolymer synthesis and subsequent silylation reaction, as well as the direct reaction of polyol and isocyanatosilane are conducted under anhydrous conditions and preferably under an inert atmosphere, such as a blanket of nitrogen, to prevent premature hydrolysis of the alkoxysilane groups. Typical temperature range for both reaction steps, is 0° to 150° C., and more preferably between 60° and 90° C. Typically, the total reaction time for the synthesis of the silylated polyurethane is between 4 to 8 hours.

The synthesis is monitored using a standard titration technique (ASTM 2572-87) or infrared analysis. Silylation of the urethane prepolymers is considered complete when no residual -NCO can be detected by either technique.

The curable sealant composition herein includes at least one other polymer (b) exhibiting permeability to a gas or mixture of gases that is less than the permeability of the cured resin (a). Suitable polymers include polyethylenes, such as, low density polyethylene (LDPE), very low density polyethylene (VLDPE), linear low density polyethylene (LLDPE) and high density polyethylene (HDPE); polypropylene (PP), polyisobutylene (PIB), polyvinyl acetate(PVAc), polyvinyl alcohol (PVoH), polystyrene, polycarbonate, polyester, such as, polyethylene terephthalate (PET), polybutylene terephthalate (PBT), polyethylene napthalate (PEN), glycol-modified polyethylene terephthalate (PETG); polyvinylchloride (PVC), polyvinylidene chloride, polyvinylidene floride, thermoplastic polyurethane (TPU), acrylonitrile butadiene styrene (ABS), polymethylmethacrylate (PMMA), polyvinyl fluoride (PVF), Polyamides (nylons), polymethylpentene, polyimide (PI), polyetherimide (PEI), polether ether ketone (PEEK), polysulfone, polyether sulfone, ethylene chlorotrifluoroethylene, polytetrafluoroethylene (PTFE), cellulose acetate, cellulose acetate butyrate, plasticized polyvinyl chloride, ionomers (Surtyn), polyphenylene sulfide (PPS), styrene-maleic anhydride, modified polyphenylene oxide (PPO), and the like and mixture thereof.

Polymer(s) (b) can also be elastomeric in nature, examples include, but are not limited to ethylene-propylene rubber (EPDM), polybutadiene, polychloroprene, polyisoprene, polyurethane (TPU), styrene-butadiene-styrene (SBS), styrene-ethylene-butadiene-styrene (SEEBS), polymethylphenyl siloxane (PMPS), and the like.

These polymers can be blended either alone or in combinations or in the form of coplymers, e.g. polycarbonate-ABS blends, polycarbonate polyester blends, grafted polymers such as, silane grafted polyethylenes, and silane grafted polyurethanes.

In one embodiment of the present invention, polymer(s) (b) is selected from the group consisting of low density polyethylene (LDPE), very low density polyethylene (VLDPE), linear low density polyethylene (LLDPE), high density polyethylene (HDPE), and mixtures thereof. In another embodiment of the invention, polymer(s) (b) is selected from the group consisting of low density polyethylene (LDPE), very low density polyethylene (VLDPE), linear low density polyethylene (LLDPE), and mixture thereof. In yet another embodiment of the present invention, polymer (b) is linear low density polyethylene (LLDPE).

Optionally, the curable sealant composition herein can also contain one or more fillers such as precipitated and colloidal calcium carbonates which have been treated with compounds such as stearic acid or stearate ester; reinforcing silicas such as fumed silicas, precipitated silicas, silica gels and hydrophobized silicas and silica gels; crushed and ground quartz, alumina, aluminum hydroxide, titanium hydroxide, diatomaceous earth, iron oxide, carbon black, graphite, mica, talc, and the like, and mixture thereof.

In one aspect of the present invention, the filler component of the curable composition is calcium carbonate, silica or a mixture thereof. The type and amount of filler added depends upon the desired physical properties for the cured silicone composition. As such, the filler may be a single species or a mixture of two or more species.

Other useful fillers can be nanoclays which possess a unique morphology with one dimension being in the nanometer range. The nanoclays can form chemical complexes with an intercalant that ionically bonds to surfaces in between the layers making up the clay particles. This association of intercalant and clay particles results in a material which is compatible with many different kinds of host resins permitting the clay filler to disperse therein.

When describing the nanoclay filler of the present invention, the following terms have the following meanings, unless otherwise indicated.

The term "exfoliation" as used herein describes a process wherein packets of nanoclay platelets separate from one another in a polymer matrix. During exfoliation, platelets at the outermost region of each packet cleave off, exposing more platelets for separation.

The term "gallery" as used herein describes the space between parallel layers of clay platelets. The gallery spacing changes depending on the nature of the molecule or polymer occupying the space. An interlayer space between individual nanoclay platelets varies, again depending on the type of molecules that occupy the space.

The term "intercalant" as used herein includes any inorganic or organic compound that is capable of entering the clay gallery and bonding to its surface.

The term "intercalate" as used herein designates a clay-chemical complex wherein the clay gallery spacing has increased due to the process of surface modification. Under the proper conditions of temperature and shear, an intercalate is capable of exfoliating in a resin matrix.

The expression "modified clay" as used herein designates a clay material that has been treated with any inorganic or organic compound that is capable of undergoing ion exchange reactions with the cations present at the interlayer surfaces of the clay.

The term "organoclay" as used herein designates a clay or other layered material that has been treated with organic molecules (variously referred to as "exfoliating agents," "surface modifiers" or "intercalants") that are capable of undergoing ion exchange reactions with the cations present at the interlayer surfaces of the clay.

The expression "organic nanoclay" as use herein describes a nanoclay that has been treated or modified with an organic or semi-organic intercalant, e.g., diorganopolysiloxane that ionically bonds to surfaces in between the layers making up the clay particles.

Useful nanoclays for providing the organic nanoclay filler component of the composition of the invention include natural or synthetic phyllosilicates, particularly smectic clays such as montmorillonite, sodium montmorillonite, calcium montmorillonite, magnesium montmorillonite, nonprofit, bedplate, volkonskoite, laponite, hectorite, saponite, sauconite, magadite, kenyaite, sobockite, svindordite, stevensite, talc, mica, kaolinite, vermiculite, halloysite, aluminate oxides, or hydrotalcites, and the like, and their mixtures. In another embodiment, useful nanoclays include micaceous minerals such as illite and mixed layered illite/smectite minerals such as rectorite, tarosovite, ledikite and admixtures of illites with one or more of the clay minerals named above. Any swellable layered material that sufficiently sorbs the organic molecules to increase the interlayer spacing between adjacent phyllosilicate platelets to at least about 5 angstroms, or to at least about 10 angstroms, (when the phyllosilicate is measured dry) can be used in producing the filler component to provide the cured sealant composition of the invention.

The nanoclays can be natural or synthetic materials. This distinction can influence the particle size and for this invention, the particles should have a lateral dimension of between about 0.01 μm and about 5 μm, and preferably between about 0.05 μm and about 2 μm, and more preferably between about 0.1 μm and about 1 μm. The thickness or the vertical dimension of the particles can in general vary between about 0.5 nm and about 10 nm and preferably between about 1 nm and about 5 nm.

In one embodiment of the present invention, organic and inorganic compounds that are useful for treating nanoclays and layered materials to provide the filler component herein include cationic surfactants such as ammonium, ammonium chloride, alkylammonium (primary, secondary, tertiary and quaternary), phosphonium or sulfonium derivatives of aliphatic, aromatic or arylaliphatic amines, phosphines or sulfides.

Other organic treating agents for nanoclays that can be used herein include amine compounds and/or quaternary ammonium compounds $R^6 R^7 R^8 N^+ X^{31}$ each independently is an alkoxy silane group, alkyl group or alkenyl group of up to 60 carbon atoms and X is an anion such as $Cl^-$, $F^-$, $SO_4^-$, etc.

The curable sealant composition can also include one or more alkoxysilanes as adhesion promoters. Useful adhesion promoters include N-2-aminoethyl-3-aminopropyltriethoxysilane, γ-aminopropyltriethoxysilane, γ-aminopropyltrimethoxysilane, aminopropyltrimethoxysilane, bis-γ-trimethoxysilylpropyl)amine, N-phenyl-γ-aminopropyltrimethoxysilane, triaminofunctionaltrimethoxysilane, γ-aminopropylmethyldiethoxysilane, γ-aminopropylmethyldiethoxysilane, methacryloxypropyltrimethoxysilane, methylaminopropyltrimethoxysilane, γ-glycidoxypropylethyldimethoxysilane, γ-glycidoxypropyltrimethoxysilane, γ-glycidoxyethyltrimethoxysilane, β-(3,4-epoxycyclohexyl)propyltrimethoxysilane, β-(3,4-epoxycyclohexyl) ethylmethyldimethoxysilane, isocyanatopropyltriethoxysilane, isocyanatopropylmethyldimethoxysilane, β-cyanoethyltrimethoxysilane, γ-acryloxypropyltrimethoxysilane, γ-methacryloxypropylmethyldimethoxysilane, 4-amino-3,3,-dimethylbutyltrimethoxysilane, and N-ethyl-3-trimethoxysilyl-2-methylpropanamine, and the like. In one embodiment, the adhesion promoter can be a combination of n-2-aminoethyl-3-aminopropyltrimethoxysilane and 1,3,5-tris(trimethoxysilylpropyl)isocyanurate.

Catalysts typically used in the preparation of the above mentioned urethane prepolymers as well as the related silylated polyurethanes (SPUR) include, those known to be useful for facilitating crosslinking in silicone sealant compositions. The catalyst may include metal and non-metal catalysts. Examples of the metal portion of the metal condensation catalysts useful in the present invention include tin, titanium, zirconium, lead, iron cobalt, antimony, manganese, bismuth and zinc compounds.

In one embodiment of the present invention, tin compounds useful for facilitating crosslinking in silicone sealant compositions include: tin compounds such as dibutyltindilaurate, dibutyltindiacetate, dibutyltindimethoxide, tinoctoate, isobutyltintriceroate, dibutyltinoxide, solubilized dibutyl tin oxide, dibutyltin bis-diisooctylphthalate, bis-tripropoxysilyl dioctyltin, dibutyltin bis-acetylacetone, silylated dibutyltin dioxide, carbomethoxyphenyl tin tris-uberate, isobutyltin triceroate, dimethyltin dibutyrate, dimethyltin di-neodecanoate, triethyltin tartarate, dibutyltin dibenzoate, tin oleate, tin naphthenate, butyltintri-2-ethylhexylhexoate, and tin-butyrate, and the like. In still another embodiment, tin compounds useful for facilitating crosslinking in silicone sealant compositions are chelated titanium compounds, for example, 1,3-propanedioxytitanium bis(ethylacetoacetate); di-isopropoxytitanium bis(ethylacetoacetate); and tetra-alkyl titanates, for example, tetra n-butyl titanate and tetra-isopropyl titanate. In yet another embodiment of the present invention, diorganotin bis β-diketonates is used for facilitating crosslinking in silicone sealant composition.

In one aspect of the present invention, the catalyst is a metal catalyst. In another aspect of the present invention, the metal catalyst is selected from the group consisting of tin compounds, and in yet another aspect of the invention, the metal catalyst is dibutyltin dilaurate.

The compositions of the present invention can also include one or more non-ionic surfactants such as polyethylene glycol, polypropylene glycol, ethoxylated castor oil, oleic acid ethoxylate, alkylphenol ethoxylates, copolymers of ethylene oxide (EO) and propylene oxide (PO) and copolymers of silicones and polyethers (silicone polyether copolymers), copolymers of silicones and copolymers of ethylene oxide and propylene oxide and mixtures thereof.

The curable compositions of the present invention can include still other ingredients that are conventionally employed in RTC silicone-containing compositions such as colorants, pigments, plasticizers, cure accelerators, thixotropic agents, moisture scavengers, dyes, solvents, antioxidants, UV stabilizers, biocides, etc., in known and conventional amounts provided they do not interfere with the properties desired for the cured compositions.

The amounts of moisture-curable silylated resin (a), other polymer (b), and optional components, such as, filler(s), adhesion promoter(s), crosslinking catalyst(s), and ionic surfactant(s) disclosed herein can vary widely and, advantageously, can be selected from among the ranges indicated in the following table.

TABLE 1

Ranges of Amounts (Weight Percent) of the Components of the Sealant Composition 7 of the Invention

| Components of the Cured Sealant Composition | First Range | Second Range | Third Range |
| --- | --- | --- | --- |
| moisture-curable silylated resin (a) | 1-99 | 10-50 | 20-30 |
| other polymer (b) | 1-99 | 5-50 | 10-20 |
| filler(s) | 0.1-80 | 10-60 | 20-55 |
| Silane Adhesion Promoter(s) | 0.1-20 | 0.3-10 | 0.5-2 |
| Catalyst(s) | 0.001-1 | 0.003-0.5 | 0.005-0.2 |
| Ionic Surfactant(s) | 0-10 | 0.1-5 | 0.5-0.75 |

The cured sealant compositions herein can be obtained by procedures that are well known in the art, e.g., melt blending, extrusion blending, solution blending, dry mixing, blending in a Banbury mixer, etc., in the presence of moisture to provide a substantially homogeneous mixture.

While the preferred embodiment of the present invention has been illustrated and described in detail, various modifications of, for example, components, materials and parameters, will become apparent to those skilled in the art, and it is intended to cover in the appended claims all such modifications and changes which come within the scope of this invention.

What is claimed is:

1. An insulated glass unit comprising at least two spaced-apart sheets of glass, or other functionally equivalent material, in spaced relationship to each other, a low thermal conductivity gas or mixture of gases therebetween and a gas sealant element including a cured sealant composition resulting from the curing of, moisture-curable silylated resin-containing composition comprising:
   a) moisture-curable silylated resin, prepared by reacting a hydroxyl-terminated polyurethane prepolymer with an isocyanatosilane, wherein the hydroxyl terminated prepolymer is prepared by reacting a molar excess of a polyether polyol selected from the group consisting of poly(oxyethylene) diols, poly(oxypropylene) diols, poly(oxyethylene-oxypropylene) diols, poly(oxyalkylene) triols and poly(tetramethylene) glycols having a number average molecular weight of from 4,000 to 18,000 grams/mole and an end group unsaturation level no greater than 0.04 milliequivalent per gram of polyol with a diisocyanate and wherein the isocyanatosilane is of the formula:

$$OCN\text{-}R^5\text{-}Si(R^6)_y(OR^7)_{3-y}$$

where $R^5$ is an alkylene group of up to 12 carbon atoms; $R^6$ is a alkyl or aryl group of up to 8 carbon atoms; $R^7$ is the same or different alkyl group of up to 6 carbon atoms; and y is 0, 1 or 2 which upon curing, provides cured resin, exhibiting permeability to gas; and,
   b) at least one other polymer having a permeability to gas that is less than the permeability of cured resin (a), and,
   c) at least one nanoclay modified with a cationic surfactant exfoliating agent, wherein the nanoclay particles have a lateral dimension of between 0.01 microns and 5 microns and a vertical dimension of between 0.5 nanometers to 10 nanometers.

2. The insulated glass unit of claim 1 wherein moisture-curable silylated resin (a) ranges from about 10 to about 50 weight percent of the total composition.

3. The insulated glass unit of claim 1 wherein moisture-curable silylated resin (a) ranges from about 20 to about 30 weight percent of the total composition.

4. The insulated glass unit of claim 1 wherein polymer (b) is selected from the group consisting of low density polyethylene, very low density polyethylene, linear low density polyethylene, high density polyethylene, polypropylene, polyisobutylene, polyvinyl acetate, polyvinyl alcohol, polystyrene, polycarbonate, polyester, such as, polyethylene terephthalate, polybutylene terephthalate, polyethylene napthalate, glycol-modified polyethylene terephthalate, polyvinylchloride, polyvinylidene chloride, polyvinylidene fluoride, thermoplastic polyurethane, acrylonitrile butadiene styrene, polymethylmethacrylate, polyvinyl fluoride, polyamides, polymethylpentene, polyimide, polyetherimide, polether ether ketone, polysulfone, polyether sulfone, ethylene chlorotrifluoroethylene, polytetrafluoroethylene, cellulose acetate, cellulose acetate butyrate, plasticized polyvinyl chloride, ionomers, polyphenylene sulfide, styrene-maleic anhydride, modified polyphenylene oxide, ethylene-propylene rubber, polybutadiene, polychloroprene, polyisoprene, polyurethane, styrene-butadiene-styrene, styrene-ethylene-butadiene-styrene, polymethylphenyl siloxane and mixtures thereof.

5. The insulated glass unit of claim 4 wherein polymer (b) is selected from the group consisting of low density polyethylene, very low density polyethylene, linear low density polyethylene, high density polyethylene, and mixtures thereof.

6. The insulated glass unit of claim 5 wherein polymer (b) is selected from the group consisting of low density polyethylene, very low density polyethylene, linear low density polyethylene, and mixtures thereof.

7. The insulated glass unit of claim 1 wherein polymer (b) ranges from about 5 to about 50 weight percent of the total composition.

8. The insulated glass unit of claim 1 wherein polymer (b) ranges from about 10 to about 20 weight percent of the total composition.

9. The insulated glass unit of claim 1 further comprising at least one other filler wherein the other filler is selected from the group consisting of calcium carbonate, precipitated calcium carbonate, colloidal calcium carbonate, calcium carbonate treated with compounds such as stearic acid or stearate esters, fumed silica, precipitated silica, silica gels, hydrophobized silicas, hydrophilic silica gels, crushed quartz, ground quartz, alumina, aluminum hydroxide, titanium hydroxide, clay, kaolin, bentonite, montmorillonite, diatomaceous earth, iron oxide, carbon black and graphite, mica, talc, and mixtures thereof.

10. The insulated glass unit of claim 1 wherein the nanoclay is selected from the group consisting of montmorillonite, sodium montmorillonite, calcium montmorillonite, magnesium montmorillonite, nonprofit, bedplate, volkonskoite, laponite, hectorite, saponite, sauconite, magadite, kenyaite, sobockite, svindordite, stevensite, vermiculite, halloysite, aluminate oxides, hydrotalcite, illite, rectorite, tarosovite, ledikite, kaolinite and, mixtures thereof.

11. The insulated glass unit of claim 1 wherein the nanoclay is modified with at least one tertiary amine compound $R^3R^4R^5N$ and/or quaternary ammonium compound $R^5R^6R^7R^8N^+X^-$ wherein $R^3$, $R^4$, $R^5$, $R^6$, $R^7$ and $R^8$ each independently is an alkyl, alkenyl or alkoxy silane group of up to 60 carbon atoms and $X^-$ is an anion.

12. The insulated glass unit of claim 1 wherein the nanoclay is modified with ammonium, primary alkylammonium, secondary alkylammonium, tertiary alkylammonium, quaternary alkylammonium, phosphonium derivatives of aliphatic, aromatic or arylaliphatic amines, phosphines or sulfides or sulfonium derivatives of aliphatic, aromatic or arylaliphatic amines, phosphines or sulfides.

13. The insulated glass unit of claim 1 further comprising an adhesion promoter wherein the adhesion promoter is selected from the group consisting of N-2-aminoethyl-3-aminopropyltrimethOXysilane, 1, 3, 5 -tris(trimethoxysilylpropyl)isocyanurate, γ-aminopropyltriethoxysilane, γ-aminopropyltrimethoxysilane, aminopropyltrimethoxysilane, bis-γ-(trimethoxysilylpropyl)amine, N-phenyl γ-aminopropyltrimethoxysilane, triaminofunctionaltrimethoxysilane, γ-aminopropylmethyldiethoxysilane, γ-aminopropylmethyldiethoxysilane, methacryloxypropyltrimethoxysilane, methylaminopropyltrimethoxysilane, γ-glycidoxypropylethyldimethoxysilane, γ-glycidoxypropyltrimethoxysilane, γ-glycidoxyethyltrimethoxysilane, β-(3, 4-epoxycyclohexyl)propyltrimethoxysilane, β-(3, 4-epoxycyclohexyl) ethylmethyldimethoxysilane, isocyanatopropyltriethoxysilane, isocyanatopropylmethyldimethoxysilane, β-cyanoethyltrimethoxysilane, γ-acryloxypropyltrimethoxysilane, γ-methacryloxypropylmethyldimethoxysilane, 4-amino-3, 3,-dimethylbutyltrimethoxysilane, N-ethyl-3-trimethoxysilyl-2-methylpropanamine, and mixtures thereof.

14. The insulated glass unit of claim 1 further comprising a catalyst wherein the catalyst is a tin catalyst.

15. The insulated glass unit of claim 14 wherein the tin catalyst is selected from the group consisting of dibutyltindilaurate, dibutyltindiacetate, dibutyltindimethoxide, tinoctoate, isobutyltintriceroate, dibutyltinoxide, solubilized dibutyl tin oxide, dibutyltin bis-diisooctylphthalate, bis-tripropoxysilyl dioctyltin, dibutyltin bis-acetylacetone, silylated dibutyltin dioxide, carbomethoxyphenyl tin trisuberate, isobutyltin triceroate, dimethyltin dibutyrate, dimethyltin di-neodecanoate, triethyltin tartarate, dibutyltin dibenzoate, tin oleate, tin naphthenate, butyltintri-2-ethylhexylhexoate, tinbutyrate, diorganotin bis β-diketonates and mixtures thereof.

16. The insulated glass unit of claim 1 further comprising a surfactant, wherein the surfactant is a nonionic surfactant selected from the group consisting of polyethylene glycol, polypropylene glycol, ethoxylated castor oil, oleic acid ethoxylate, alkylphenol ethoxylates, copolymers of ethylene oxide and propylene oxide and copolymers of silicones and polyethers, copolymers of silicones and copolymers of ethylene oxide and propylene oxide and mixtures thereof.

17. The insulated glass unit of claim 16 wherein the nonionic surfactant is selected from the group consisting of copolymers of ethylene oxide and propylene oxide, copolymers of silicones and polyethers, copolymers of silicones and copolymers of ethylene oxide and propylene oxide and mixtures thereof.

18. The insulated glass unit of claim 1 wherein the insulating gas is selected from the group consisting of air, carbon dioxide, sulfur hexafloride, nitrogen, argon, krypton, xenon, and mixtures thereof.

* * * * *